United States Patent
Kizhakkiniyil et al.

(10) Patent No.: US 9,772,920 B2
(45) Date of Patent: Sep. 26, 2017

(54) DYNAMIC SERVICE FAULT DETECTION AND RECOVERY USING PEER SERVICES

(71) Applicant: Apollo Education Group, Inc., Phoenix, AZ (US)

(72) Inventors: Sajithkumar Kizhakkiniyil, Pleasanton, CA (US); Anil Maipady, San Jose, CA (US); Krishnam Chapa, Bangalore (IN); Narender Vattikonda, San Jose, CA (US); Jeevan Pingali, Bangalore (IN); Rahul Kumar, Bangalore (IN)

(73) Assignee: Apollo Education Group, Inc., Phoenix, AZ (US)

( * ) Notice: Subject to any disclaimer, the term of this patent is extended or adjusted under 35 U.S.C. 154(b) by 19 days.

(21) Appl. No.: 14/700,083

(22) Filed: Apr. 29, 2015

(65) Prior Publication Data
US 2016/0321147 A1    Nov. 3, 2016

(51) Int. Cl.
*G06F 11/30* (2006.01)
*G06F 11/34* (2006.01)

(52) U.S. Cl.
CPC ...... *G06F 11/3006* (2013.01); *G06F 11/3051* (2013.01); *G06F 11/3055* (2013.01); *G06F 11/3433* (2013.01); *G06F 2201/81* (2013.01); *G06F 2201/875* (2013.01)

(58) Field of Classification Search
CPC .................. G06F 11/2028; G06F 11/2097
USPC .......................................... 714/4.11, 6.3, 26
See application file for complete search history.

(56) References Cited

U.S. PATENT DOCUMENTS

| | | | | |
|---|---|---|---|---|
| 2002/0184376 A1* | 12/2002 | Sternagle | ................ | H04L 29/06 709/230 |
| 2007/0156874 A1* | 7/2007 | Magro | ................ | H04L 61/6077 709/223 |
| 2007/0266136 A1* | 11/2007 | Esfahany | ............. | H04L 41/022 709/223 |
| 2008/0221856 A1* | 9/2008 | Dubnicki | ............. | G06F 3/0608 703/21 |
| 2009/0132543 A1* | 5/2009 | Chatley | ................. | G06F 3/0613 |
| 2009/0271412 A1* | 10/2009 | Lacapra | ............ | G06F 17/30206 |
| 2010/0293338 A1* | 11/2010 | Krishnaprasad | .... | G06F 12/0813 711/136 |
| 2011/0107358 A1* | 5/2011 | Shyam | .................. | G06F 9/5027 719/330 |
| 2011/0283149 A1* | 11/2011 | Richmond | .......... | G06F 11/0709 714/39 |
| 2013/0227022 A1* | 8/2013 | Trivedi | ................... | H04L 63/04 709/204 |

(Continued)

*Primary Examiner* — Chae Ko
(74) *Attorney, Agent, or Firm* — Hickman Palermo Becker Bingham LLP

(57) ABSTRACT

Techniques are described for identifying unhealthy nodes in a multi-node system. One or more parameters of each node is monitored, then compared with the values for the same parameter running on other nodes in the multi-node system. Based on the comparison, a determination is made whether a node is healthy. If the multi-node system comprises one or more nodes with differing capabilities, an adjustment is performed to account for the differing capabilities of each respective node. Further provided are methods of taking remedial action upon a determination that a node is unhealthy. A tuner is used to modify values of health parameters until the node is performing similarly to its peers.

16 Claims, 3 Drawing Sheets

(56) References Cited

U.S. PATENT DOCUMENTS

| | | | |
|---|---|---|---|
| 2014/0046997 A1* | 2/2014 | Dain | H04L 67/2861 709/201 |
| 2014/0324881 A1* | 10/2014 | Ransil | G06F 17/30336 707/741 |
| 2014/0325058 A1* | 10/2014 | Fletcher | H04L 43/045 709/224 |
| 2014/0351412 A1* | 11/2014 | Elisha | H04L 41/0806 709/224 |
| 2015/0121134 A1* | 4/2015 | Wipfel | G06F 11/2094 714/6.31 |
| 2016/0026535 A1* | 1/2016 | Bhat | G06F 11/2097 714/19 |
| 2016/0088006 A1* | 3/2016 | Gupta | H04L 63/1425 726/23 |

* cited by examiner

DYNAMIC SERVICE FAULT DETECTION AND RECOVERY USING PEER SERVICES

FIELD OF THE INVENTION

The present invention relates to methods and systems for identifying unhealthy or underperforming nodes in a distributed computing system, as well as methods and systems for taking remedial action in relation to those nodes, or services running on those nodes.

BACKGROUND

A computer cluster is a collection of one or more computer systems or nodes, having associated processes, that work together to provide a single, unified computing capability, such that the cluster operates as though it were a single system. Computing tasks can be distributed across multiple nodes within the cluster.

In such a distributed computing environment with many computing nodes hosting services, it is critical that each node used to provide the services be "healthy". One way to determine whether a node is unhealthy is to compare some "health parameter" of the node against some established threshold limits. Unfortunately, determining whether a node is unhealthy based on static information, such as a threshold limits, may not accurately reflect the health of the node. For example, a node may be operating within the threshold limits, but still be performing significantly worse than the node should be performing under the current runtime conditions. A need exists for improved ways to monitor distributed computing systems and to identify and correct unhealthy or underperforming nodes.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Methods and systems are provided for identifying unhealthy or underperforming nodes in a set of nodes collectively comprising a network cluster. Rather than determine the health of a node based on a comparison between a health parameter of the node and a static minimum threshold value, the health parameter value of the node is compared to the health parameter values of other nodes within the cluster. A node is deemed healthy or unhealthy based, at least in part, on the difference between how the node is performing and how the node should be performing given the performance of the other nodes.

System Overview

The network cluster computing system described herein generally includes one or more computer systems connected to one another via a communications network or networks. The communications network can comprise a local area network, a wide area network, an intranet, the Internet, etc. In one embodiment, each computer system within the cluster comprises one or more processors such as, for example, a microprocessor that can comprise one or more processing cores. The term "node" refers to a processing unit that is capable of execution of code. The processors can be connected to one or more memory devices such as, for example, random access memory ("RAM"), and/or one or more optional storage devices such as, for example, a hard disk.

Communications among the nodes of a cluster, between clusters, and between nodes and other devices may occur, for example, via a communications network as above, via one or more local buses of a computer system, and/or via a LAN, a WAN, or any other communications network capable of carrying signals among computer system components. In one embodiment, one or more software modules such as services or online applications can run on nodes within the interconnected computer systems. In one embodiment, the modules are designed to run on only a single node. In another embodiment, cluster node modules or services communicate with each other in order to implement cluster or distributed computing functionality.

Figure 1:
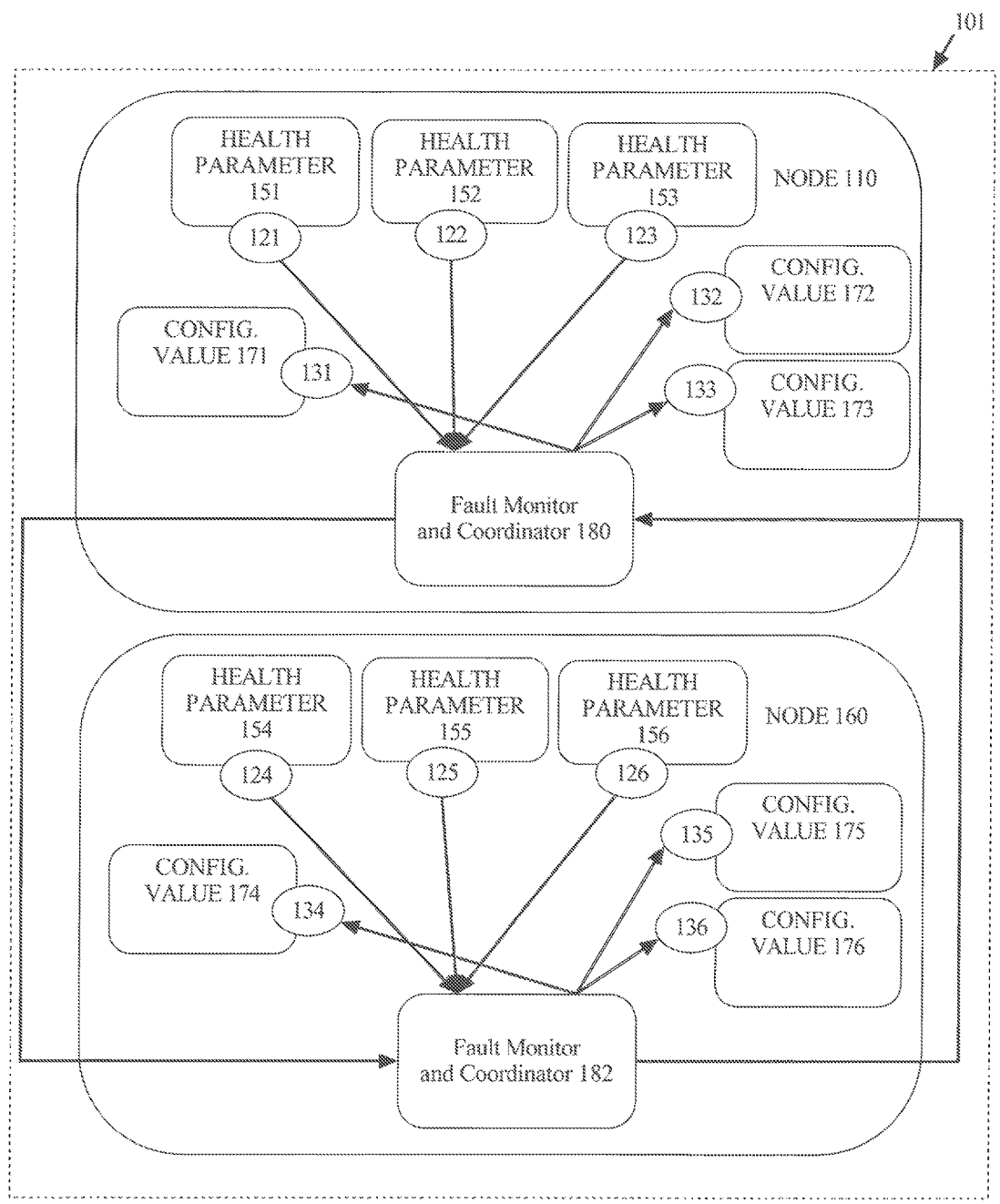
FIG. 1 is a block diagram of a node cluster.

FIG. 1 is a block diagram that depicts an exemplary embodiment of a service node cluster 101 consisting of two nodes 110, 160. While cluster 101 has two nodes, the techniques described herein may be used in systems that have any number of nodes. Further, clusters such as cluster 101 can be operatively coupled to other clusters by means of a communications network such as a LAN, WAN, wireless network, or Internet. Alternatively, cluster 101 can communicate with other clusters over a local communications architecture such as a local bus.

Each node 110, 160 can be configured to run one or more services. In one embodiment, a service can comprise a software module or program configured to run on a single node, or in a distributed manner across multiple nodes.

Health Parameters, System Values, and Configuration Values

Each node 110, 160 within cluster 101 has one or more associated health parameters. In the illustrated embodiment, node 110 has three health parameters 151, 152 and 153, and node 160 has three health parameters 154, 155 and 156. As used herein, a "health parameter" generally refers to an observable and measurable runtime characteristic of the node. Health parameters may include, for example, request response time, error rate, file handle count, iops (Input/Output Operations Per Second), read-to-write ratio, heap usage, time spent garbage collection, connection pool stats, or any other observable and measurable characteristic of the node.

Health parameters are typically influenced by system values. A "system value" of a node is a value that indicates a characteristic of the hardware configuration of the node. Thus, system values typically are not changeable by software configuration alone. For example, system values include CPU speed, memory size, power consumption, network bandwidth. As an example of how a system value can influence a health parameter, a "resource utilization" health parameter of a node would be influenced by how much memory the node has, as indicated by the "memory size" system value.

Health parameters can also be influenced by configuration values. A configuration value is generally a software-modifiable value that is assigned to a system setting. Configuration values typically can be modified as required in order for the node to which the configuration value corresponds to function properly or optimally. In the embodiment illustrated in FIG. 1, node 110 has three configuration values 171, 172 and 172. Similarly, node 160 has three configuration values 174, 175 and 175.

While each node has three configuration values in the illustrated embodiment, in alternative embodiments the number and type of configuration values used by each node may vary widely. Examples of configuration values include: connection pool size, data unit size, listener queue size, batch operation size, page size, operation timeout, fetch size or any other variable that is modifiable and that impacts the performance of a node.

Fault Monitors and Coordinators

In the embodiment illustrated in FIG. 1, a fault monitor and coordinator (FMC) 180 executing on node 110 has access to health parameters 151, 152 and 153 and configuration values 171, 172 and 173. Similarly, an FMC 182 executing on node 160 has access to health parameters 154, 155 and 156, and configuration values 174, 145 and 176. FMCs 180 and 182 generally represent software modules implemented and running on nodes 110, 160, respectively.

In the embodiment illustrated in FIG. 1, each health parameter has a corresponding sensor, and each configuration value has a corresponding tuner. Specifically, on node 110, health parameters 151, 152 and 153 have sensors 121, 122 and 123, respectively. Configuration values 171, 172 and 173 have tuners 131, 132 and 133, respectively. Similarly, within node 160, health parameters 154, 155 and 156 have sensors 124, 125 and 126, respectively. Configuration values 174, 175 and 176 have tuners 134, 135 and 136, respectively.

As used herein, the term "sensor" generally refers to a component that makes measurements and reports observations to the FMC 180 about one or more health parameters of the node within which the sensor resides. While the embodiment illustrated in FIG. 1 includes one sensor per health parameter, in alternative embodiments each sensor may measure multiple health parameters. For example, a single sensor may measure health parameters 151, 152, and 153.

The term "tuner" refers to a component that actuates changes to configuration values of a node in an attempt to bring the node back to a healthy running state. According to one embodiment, tuners take as input instructions from the FMCs, and make adjustments or changes to the associated node's configuration values on the basis of those instructions. For example, configuration value 171 may control the size of the connection pool used by node 110, and tuner 131 can receive and perform an instruction from the FMC 180 to change configuration value 171 to increase the size of the connection pool.

According to one embodiment, each FMC module is operatively coupled to FMC modules that are running on other nodes. For example, according to one embodiment, FMC module 180 of node 110 receives from FMC 182 the health parameters 154, 155 and 156 of node 160. Similarly, FMC 180 sends the health parameters 151, 152 and 153 of node 110 to FMC 182 of node 160. In order to determine which nodes 110, 160 in the cluster 101 are unhealthy (that is, underperforming, or not functioning correctly), the system thus collects information from each node 110, 160 and takes into account the relative performance of the node compared to its peers, for a given set of health parameters.

Health Monitoring and Correction

Figure 2:
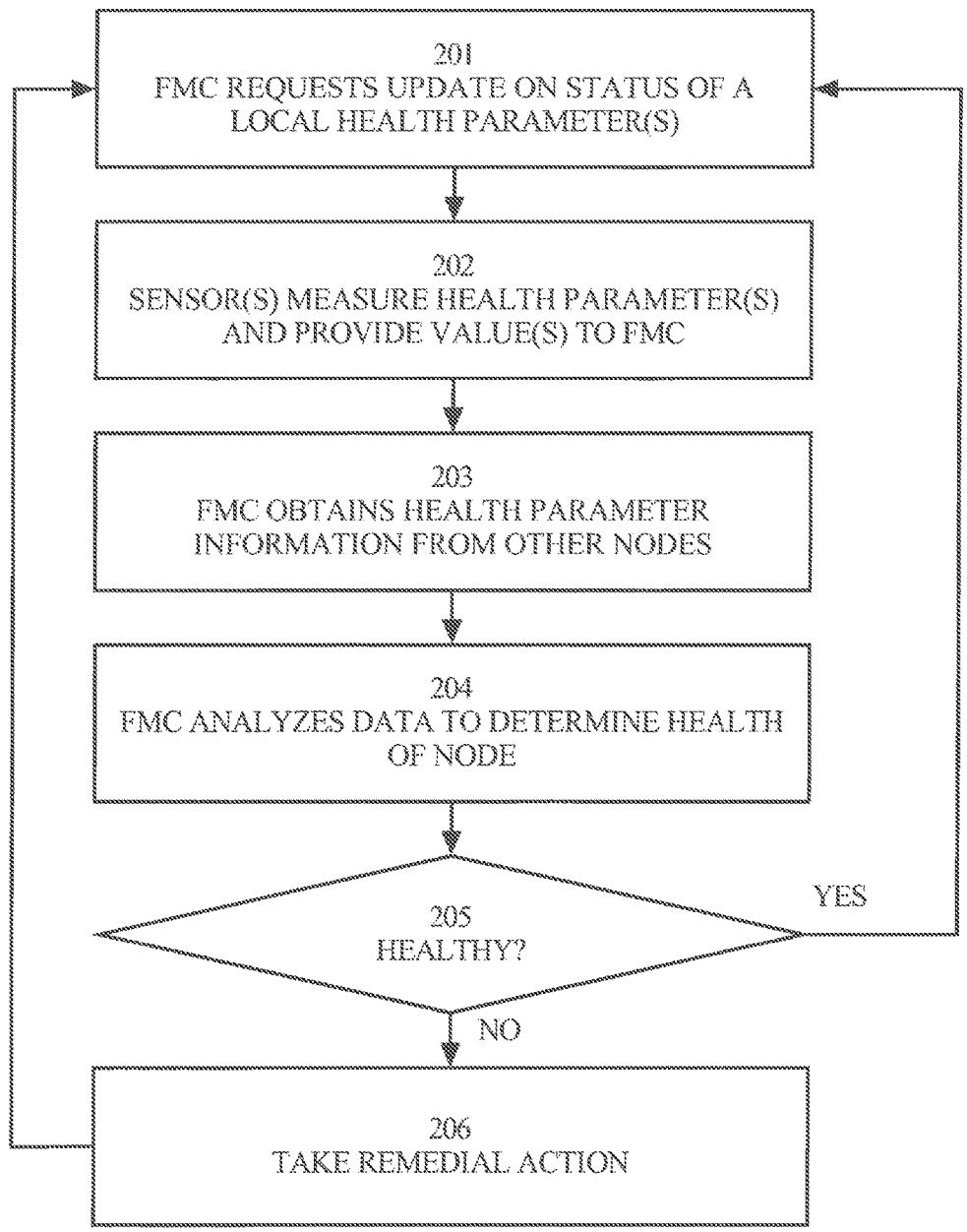
FIG. 2 depicts a schematic diagram depicting node health monitoring and correction.

FIG. 2 is a flowchart that depicts a process of node health monitoring and correction, according to one embodiment. For the purpose of illustration, the illustrated in FIG. 2 shall be described in conjunction with the components illustrated in FIG. 1.

Referring to FIG. 2, at step 201, FMC 180 of node 110 requests an update on the status of health parameters 151, 152 and 153 from the associated sensors 121, 122 and 123. At step 202, sensors 121, 122 and 123 respectively measure or query the health parameters 151, 152 and 153 and report the values back to the FMC 180.

At step 203, the FMC 180 receives information about the health parameters from the FMCs of other nodes. For example, FMC 180 may receive, from FMC 182 of node 160, information about the current state of health parameters 154, 155 and 156.

At step 204, the FMC 180 undertakes an analysis of the data it has gathered to determine whether node 110 is healthy. In one embodiment, the FMC 180 makes the health determination by comparing the health parameter values gathered from its own node 110, to health parameter values gathered from the other nodes in the cluster 101. If the cluster 101 is deployed with identically provisioned nodes, then the health parameter values of node 110 may be compared directly with the corresponding health parameter values of node 160. For example, assume that health parameter 151 indicates the current resource utilization of node 110, while health parameter 154 indicates the current resource utilization of node 160. If nodes 110 and 160 are substantially identical, then if both nodes are healthy the value of health parameter 151 should be close to the value of health parameter 154. However, a large discrepancy between the value of parameters 151 and 154 implies that one of the nodes is not functioning optimally. In another embodiment, the FMC 180 determines whether node 110 is healthy by determining whether the health parameters of the first node exceed predetermined minimum health parameters.

At step 205, FMC 180 determines whether node 110 is healthy based on the analysis performed at step 204. Upon determining that node 110 is unhealthy, control passes to step 206 where FMC 180 initiates appropriate remedial action. In one embodiment, the remedial action will be tailored to the observed problem. For example, if the FMC 180 determines that database performance is degraded because there are too many requests inbound, then FMC 180 can issue instructions to the tuner 131 to increase the connection pool size, which is controlled by configuration value 171.

According to one embodiment, FMC 180 determines the appropriate amount of additional resources or parameter changes based, at least in part, on the configuration values being used by those nodes whose health parameters indicate healthy operation (e.g. peer node 160). The FMC 180 then issues these remedial measures as instructions to tuner 131, which, in turn, applies the changes to the configuration value 171.

Upon determining that node 110 is unhealthy at step 205, control passes to back step 201, where the process is repeated on an ongoing basis. For example, the process illustrated in FIG. 2 may be repeated, by the FMC of each node in the cluster 101, at regular intervals to minimize the time any node spends in unhealthy status, and ensure optimal operation of the cluster 101.

In one embodiment, the node health determination may be made on a health parameter by health parameter basis. A specific example can server to illustrate the point more clearly, from the perspective of node 110. By reference to the cluster 100 and nodes 110, 160 seen in FIG. 1, in an example, health parameters 151, 154 may be request response time. Health parameter 152, 155 may be file handle count. Health parameter 153, 156 may be error rate.

The FMC 180 may obtain values 151, 152 and 153 by means of querying sensors 121, 122, 123. In this example, a value obtained for parameter 151 may be 1.2 seconds. A value obtained for parameter 152 may be 650. A value obtained for parameter 153 may be 2 per second.

Peer FMC 182 may obtain values 154, 155 and 156 by means of querying sensors 124, 125, 126. In this example, a value obtained for parameter 154 may be 0.6 seconds. A value obtained for parameter 155 may be 680. A value obtained for parameter 156 may be 3 per second. The peer FMC 182 may communicate the health parameter values to the current node FMC 180.

The FMC 180 may proceed to compare the health parameter values in order to make a determination whether node 110 is healthy or not. Using the values noted above, parameters 152 and 153 are substantially similar with equivalent health parameters 155, 156 on node 160.

To initiate remedial action, the FMC 180 may attempt to change one or more configuration values 171-173. For example, the FMC 180 may attempt to issue instructions to tuner 131 to increase the connection pool size 171. As the connection pool size increases, the value for request response time measured by parameter 151 may drop and the performance of the node 110 will be brought back into line with the other nodes, and therefore return to a healthy state.

Heterogeneous Clusters

In the event that a cluster of nodes is heterogeneous—in other words, if different nodes in have differing capabilities and are provisioned with different hardware—the comparison between health parameters on different nodes must be adjusted to take those differing capabilities into account.

To fully illustrate the operation of the present method and system, it may be beneficial to refer to an example embodiment comprising four differently provisioned nodes. With reference to FIG. 1, there is shown a functional block diagram of a service node cluster 101 in which one embodiment of the present invention may be implemented. As shown, cluster 101 comprises, among other things, a node 110. In the example heterogeneous embodiment, there are four nodes 110. For referencing purposes, similar elements will be referenced using the same reference number. For example, the reference number 110 is used for all of the nodes. This reference number will be used when referring to a server generally. When it is desired to refer to a specific server, then an additional index will be used, for example, node 110(1), 110(2) and so on. This convention will be used for the other elements as well.

In the example embodiment, suppose the nodes are provisioned with processors of differing speeds: node 110(1) has a processor speed of 1.6 GHz, node 110(2) has a processor speed of 2.5 GHz, node 110(3) has a processor speed of 3.2 GHz, and node 110(4) has a processor speed of 2.5 GHz.

In one embodiment, remote health parameters values may be adjusted by normalizing them to the value of the current node. Referring to the example embodiment above, node 101(2) is approximately 56% faster than node 110(1), therefore health parameter values 151-153(2) may be adjusted by approximately 64% of their value in order to make a direct comparison with health parameters 151-153(1). Similarly, node 110(3) is 100% faster than node 110(1), therefore health parameter values 151-153(3) may be adjusted by approximately 100% of their value in order to make a direct comparison with health parameters 151-153(1).

Supposing that health parameters 151(1)-154(4) measure response time, and that the FMC 180(1) of the first node 110(1) obtains the following values: 2.2 seconds from 151(1), 1.3 seconds from 151(2), 1.1 seconds from 151(3), and 1.4 seconds from 151(4). The normalized values are as follows: 2.1 seconds for 151(2), 2.2 seconds for 151(3) and 2.3 seconds for 151(4). In this example, the value for first node 151(1) is substantially similar as the normalized values 151(2)-151(4) and therefore node 110(1) is healthy.

Supposing now that health parameters 151(1)-154(4) measure response time as before, but that the FMC 180(1) of the first node 110(1) obtains the following values: 3.1 seconds from 151(1), 1.3 seconds from 151(2), 1.1 seconds from 151(3), and 1.4 seconds from 151(4). The normalized values for the remote nodes are as follows: 2.1 seconds for 151(2), 2.2 seconds for 151(3) and 2.3 seconds for 151(4). In this example, the value for first node 151(1) is over 50% greater than as the normalized values 151(2)-151(4). The node is therefore unhealthy and remedial action is required. As noted below, the comparison between the first node health parameter and the remote node health parameters can be made in a number of ways.

In one embodiment, the remote health parameter values may be adjusted based on the system values of their respective node. An average of the adjusted remote health parameters values may be calculated. A determination of node health may be made by comparing the average value of the remote health parameter values with the health parameter value on the current node.

In one embodiment, the remote health parameter values may be adjusted based on the system values of their respective node. A median of the adjusted remote health parameters values may be calculated. A determination of node health may be made by comparing the median value of the remote health parameter values with the health parameter value on the current node.

In one embodiment, the remote health parameter values may be adjusted based on the system values of their respective node. A high or best of the adjusted remote health parameters values may be calculated. A determination of node health may be made by comparing the high or best value of the remote health parameter values with the high or best health parameter value on the current node.

In one embodiment, the system may identify only nodes with the same or substantially similar characteristics. A determination of node health may be made by comparing the health parameters value directly as detailed above for a system with identically provisioned nodes.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
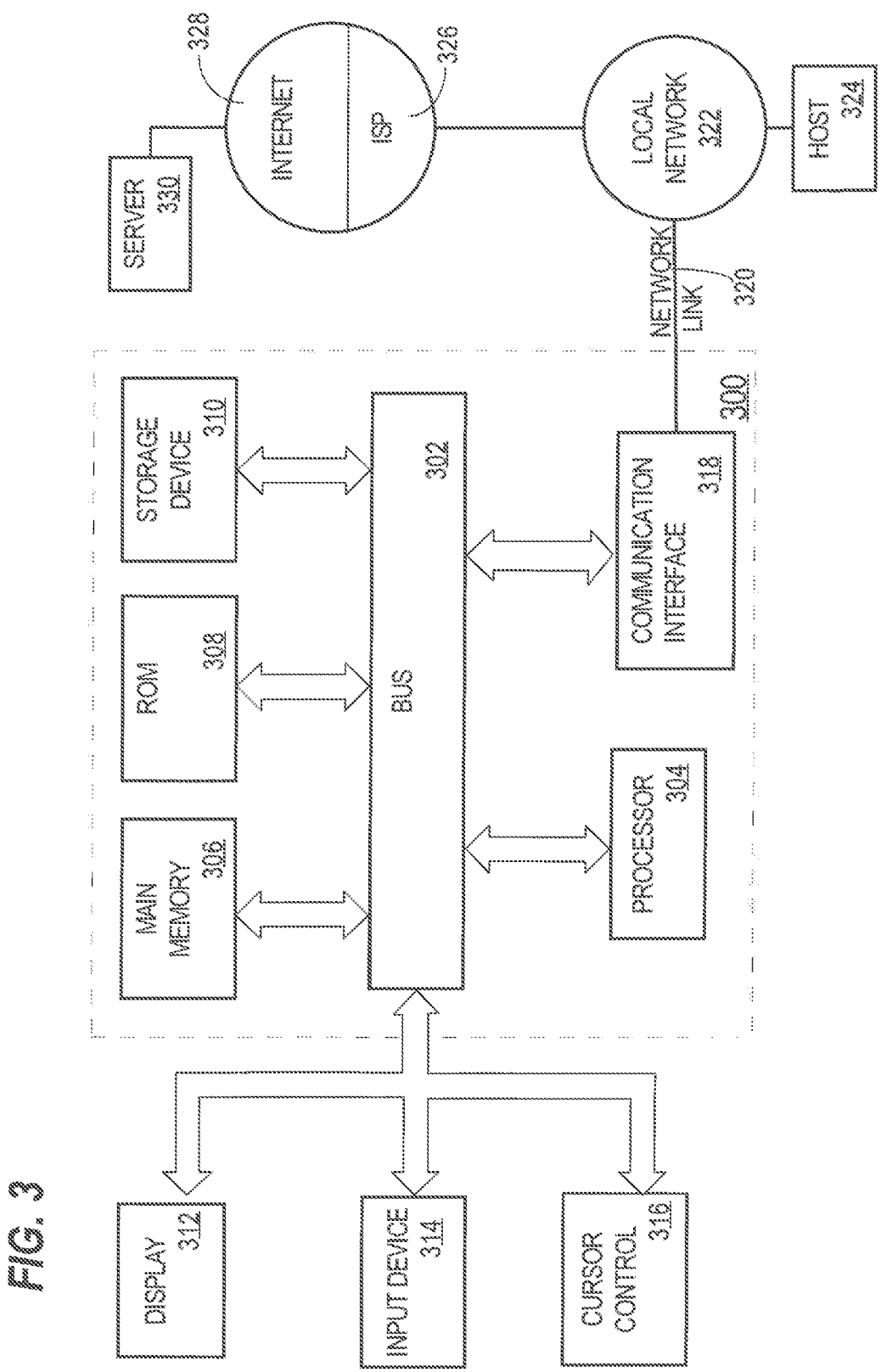
FIG. 3 is a block diagram of a computer system on which embodiments may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of identifying unhealthy nodes in a multi-node system, comprising:
    monitoring one or more health parameters of each node of a plurality of nodes in the multi-node system;
    wherein the plurality of nodes include a first node and one or more other nodes;
    determining expected performance of the first node based on the one or more health parameters of the one or more other nodes;
    determining actual performance of the first node based on the one or more health parameters of the first node;
    performing a comparison between the expected performance of the first node and the actual performance of the first node;
    based at least in part on the comparison, determining whether the first node is an unhealthy node; and
    responsive to determining that the first node is an unhealthy node, performing a remedial action relative to the first node;
    wherein the method is performed automatically by one or more computing devices.

2. The method of claim 1 wherein:
    the one or more other nodes have different capabilities than the first node; and
    the method includes, based on the different capabilities, adjusting, prior to performing the comparison, at least one of
        the one or more health parameters of the first node, or
        the one or more health parameters of the one or more other nodes.

3. The method of claim 1 wherein:
    the step of determining whether the first node is an unhealthy node is further based on whether the one or more health parameters of the first node exceed predetermined minimum health parameters; and
    the first node is determined to be unhealthy if either:
        the comparison indicates that the actual performance of the first node is a threshold amount below the expected performance of the first node; or
        the one or more health parameters of the first node do not exceed the predetermined minimum health parameters.

4. The method of claim 1 wherein:
    the first node is executing a particular service; and
    the one or more other nodes are nodes that are peer nodes that are executing the particular service.

5. The method of claim 1 wherein performing a remedial action includes:
    determining which nodes of the one or more other nodes are healthy based on the one or more health parameters of the one or more other nodes, and
    adjusting one or more configuration values of the first node based on one or more configuration values used by at least one healthy node of the one or more other nodes.

6. The method of claim 5, wherein determining which nodes of the one or more other nodes are healthy includes:
    determining an average value of the one or more health parameters of the one or more other nodes; and
    comparing the average value of the one or more health parameters with the one or more health parameters of the first node.

7. The method of claim 5, wherein determining which nodes of the one or more other nodes are healthy includes:
    determining a median value of the one or more health parameters of the one or more other nodes; and
    comparing the median value of the one or more health parameters with the one or more health parameters of the first node.

8. The method of claim 5, wherein determining which nodes of the one or more other nodes are healthy includes:
    determining a high value of the one or more health parameters of the one or more other nodes; and
    comparing the high value of the one or more health parameters with the one or more health parameters of the first node.

9. One or more non-transitory computer-readable media storing one or more sequences of instructions for identifying unhealthy nodes in a multi-node system which, when executed by one or more processors, cause:
    monitoring one or more health parameters of each node of a plurality of nodes in the multi-node system;
    wherein the plurality of nodes include a first node and one or more other nodes;
    determining expected performance of the first node based on the one or more health parameters of the one or more other nodes;
    determining actual performance of the first node based on the one or more health parameters of the first node;
    performing a comparison between the expected performance of the first node and the actual performance of the first node;
    based at least in part on the comparison, determining whether the first node is an unhealthy node; and
    responsive to determining that the first node is an unhealthy node, performing a remedial action relative to the first node.

10. The one or more non-transitory computer-readable media of claim 9 wherein:
    the one or more other nodes have different capabilities than the first node; and
    the one or more sequences of instructions further comprise instructions which, when executed by one or more processors, cause: based on the different capabilities, adjusting, prior to performing the comparison, at least one of the one or more health parameters of the first node, or
        the one or more health parameters of the one or more other nodes.

11. The one or more non-transitory computer-readable media of claim 9 wherein:
    determining whether the first node is an unhealthy node is further based on whether the one or more health parameters of the first node exceed predetermined minimum health parameters; and the first node is determined to be unhealthy if either:
  the comparison indicates that the actual performance of the first node is a threshold amount below the expected performance of the first node; or
  the one or more health parameters of the first node do not exceed the predetermined minimum health parameters.

12. The one or more non-transitory computer-readable media of claim 9 wherein:
  the first node is executing a particular service; and
  the one or more other nodes are nodes that are peer nodes that are executing the particular service.

13. The one or more non-transitory computer-readable media of claim 9 wherein performing a remedial action includes:
  determining which nodes of the one or more other nodes are healthy based on the one or more health parameters of the one or more other nodes, and
  adjusting one or more configuration values of the first node based on one or more configuration values used by at least one healthy node of the one or more other nodes.

14. The one or more non-transitory computer-readable media of claim 13, wherein determining which nodes of the one or more other nodes are healthy includes:
  determining an average value of the one or more health parameters of the one or more other nodes; and
  comparing the average value of the one or more health parameters with the one or more health parameters of the first node.

15. The one or more non-transitory computer-readable media of claim 13, wherein determining which nodes of the one or more other nodes are healthy includes:
  determining a median value of the one or more health parameters of the one or more other nodes; and
  comparing the median value of the one or more health parameters with the one or more health parameters of the first node.

16. The one or more non-transitory computer-readable media of claim 13, wherein determining which nodes of the one or more other nodes are healthy includes:
  determining a high value of the one or more health parameters of the one or more other nodes; and
  comparing the high value of the one or more health parameters with the one or more health parameters of the first node.

* * * * *